US012394357B2

(12) United States Patent
Kim et al.

(10) Patent No.: US 12,394,357 B2
(45) **Date of Patent: *Aug. 19, 2025**

(54) SCAN DRIVER AND DISPLAY DEVICE HAVING THE SAME

(71) Applicant: Samsung Display Co., Ltd., Yongin-si (KR)

(72) Inventors: Kang Nam Kim, Yongin-si (KR); Sung Hoon Lim, Yongin-si (KR); Woo Geun Lee, Yongin-si (KR); Kyu Sik Cho, Yongin-si (KR); Jae Beom Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,585

(22) Filed: Jun. 3, 2024

(65) Prior Publication Data

US 2024/0331608 A1 Oct. 3, 2024

Related U.S. Application Data

(63) Continuation of application No. 18/132,704, filed on Apr. 10, 2023, now Pat. No. 12,002,404, which is a (Continued)

(30) Foreign Application Priority Data

May 23, 2019 (KR) ........................ 10-2019-0060734

(51) Int. Cl.
*G09G 3/20* (2006.01)
*G09G 3/3233* (2016.01)
*G09G 3/3266* (2016.01)

(52) U.S. Cl.
CPC ......... *G09G 3/2092* (2013.01); *G09G 3/3233* (2013.01); *G09G 3/3266* (2013.01);
(Continued)

(58) Field of Classification Search
CPC ... G09G 2300/0426; G09G 2300/0819; G09G 2300/0842; G09G 2310/0202;
(Continued)

(56) References Cited

U.S. PATENT DOCUMENTS

| | | | | |
|---|---|---|---|---|
| 9,830,856 B2 * | 11/2017 | Kwon | .................. | G09G 3/3266 |
| 10,109,252 B2 | 10/2018 | Cho et al. | | |

(Continued)

FOREIGN PATENT DOCUMENTS

| | | |
|---|---|---|
| CN | 108932930 A | 12/2018 |
| CN | 109272939 A | 1/2019 |

(Continued)

*Primary Examiner* — Mihir K Rayan
(74) *Attorney, Agent, or Firm* — Womble Bond Dickinson (US) LLP

(57) ABSTRACT

A scan driver includes a plurality of stages. An nth (n is a natural number) stage among the stages includes: a first and a second input circuit for controlling a voltage of a first node in response to a carry signal of a previous stage and a next stage, respectively; a first output circuit for outputting an nth carry signal corresponding to a carry clock signal in response to the voltage of the first node; a second output circuit for outputting an nth scan and an nth sensing signal corresponding to a scan and a sensing clock signal, respectively, in response to the voltage of the first node; and a sampling circuit for storing the carry signal of the previous stage in response to a first select signal, and for supplying a control voltage to the first node in response to a second select signal and the stored carry signal.

13 Claims, 10 Drawing Sheets

Related U.S. Application Data continuation of application No. 17/478,825, filed on Sep. 17, 2021, now Pat. No. 11,626,060, which is a continuation of application No. 16/875,682, filed on May 15, 2020, now Pat. No. 11,127,339.

(52) U.S. Cl.
CPC ............... *G09G 2310/0202* (2013.01); *G09G 2310/0267* (2013.01); *G09G 2310/0275* (2013.01); *G09G 2310/0286* (2013.01); *G09G 2310/08* (2013.01)

(58) Field of Classification Search
CPC ... G09G 2310/0267; G09G 2310/0275; G09G 2310/0286; G09G 2310/08; G09G 2320/0295
See application file for complete search history.

(56) References Cited

U.S. PATENT DOCUMENTS

| | | | | |
|---|---|---|---|---|
| 10,121,434 | B2 | 11/2018 | Park et al. | |
| 10,121,439 | B2 | 11/2018 | Kim et al. | |
| 10,547,316 | B2 | 1/2020 | Takasugi et al. | |
| 10,706,784 | B2 | 7/2020 | Kim et al. | |
| 11,127,339 | B2 | 9/2021 | Kim et al. | |
| 11,238,809 | B2 | 2/2022 | Park et al. | |
| 11,626,060 | B2 | 4/2023 | Kim et al. | |
| 12,002,404 | B2 * | 6/2024 | Kim | G09G 3/2092 |
| 2007/0040793 | A1 | 2/2007 | Kim et al. | |
| 2008/0170029 | A1 | 7/2008 | Kim | |
| 2015/0042689 | A1 | 2/2015 | Kim et al. | |
| 2015/0317954 | A1 | 11/2015 | Jang | |
| 2016/0210928 | A1 | 7/2016 | Cho et al. | |
| 2016/0225307 | A1 | 8/2016 | Yoon et al. | |
| 2018/0337682 | A1 | 11/2018 | Takasugi et al. | |
| 2019/0103049 | A1 | 4/2019 | Noh et al. | |
| 2019/0164498 | A1 | 5/2019 | Jang | |
| 2019/0325834 | A1 | 10/2019 | Feng et al. | |
| 2020/0074933 | A1 | 3/2020 | Ban et al. | |
| 2020/0074937 | A1 | 3/2020 | Choi | |

FOREIGN PATENT DOCUMENTS

| | | | |
|---|---|---|---|
| KR | 10-2016-0073928 | A | 6/2016 |
| KR | 10-2016-0122907 | A | 10/2016 |
| KR | 10-2017-0078978 | A | 7/2017 |
| KR | 10-2017-0081802 | A | 7/2017 |
| KR | 10-2018-0128123 | A | 12/2018 |

* cited by examiner

SCAN DRIVER AND DISPLAY DEVICE HAVING THE SAME

CROSS-REFERENCE TO RELATED APPLICATIONS

This application is a continuation of U.S. patent application Ser. No. 18/132,704, filed Apr. 10, 2023, which is a continuation of U.S. patent application Ser. No. 17/478,825, filed Sep. 17, 2021, now U.S. Pat. No. 11,626,060, which is a continuation of U.S. patent application Ser. No. 16/875,682, filed May 15, 2020, now U.S. Pat. No. 11,127,339, which claims priority to and the benefit of Korean Patent Application No. 10-2019-0060734, filed May 23, 2019, the entire content of all of which is incorporated herein by reference.

BACKGROUND

1. Field

The present disclosure generally relates to a scan driver and a display device having the same.

2. Related Art

A display device includes a data driver, a scan driver, and pixels. The data driver generates a data signal, and the scan driver generates a scan signal. The scan driver sequentially supplies a scan signal to the pixels, and accordingly, the pixels are sequentially selected. A data signal is provided to a selected pixel, and the selected pixel emits light with a luminance corresponding to the data signal.

SUMMARY

Aspects of example embodiments are directed to a scan driver capable of selecting only a specific pixel so as to measure mobility information and threshold voltage information of a driving transistor of each of pixels.

Aspects of example embodiments are also directed to a scan driver configured to selectively generate a scan signal and a display device having the scan driver.

In accordance with an embodiment of the present disclosure, there is provided a scan driver including a plurality of stages, wherein an nth (n is a natural number) stage from among the stages includes: a first input circuit configured to control a voltage of a first node in response to a carry signal of a previous stage of the nth stage, which is supplied to a first input terminal; a second input circuit configured to control the voltage of the first node in response to a carry signal of a next stage of the nth stage, which is supplied to a second input terminal; a first output circuit configured to output, to a first output terminal, an nth carry signal corresponding to a carry clock signal supplied to a first clock terminal in response to the voltage of the first node; a second output circuit configured to output, to a second output terminal, an nth scan signal corresponding to a scan clock signal supplied to a second clock terminal in response to the voltage of the first node, and output, to a third output terminal, an nth sensing signal corresponding to a sensing clock signal supplied to a third clock terminal in response to the voltage of the first node; and a sampling circuit configured to store the carry signal of the previous stage in response to a first select signal supplied to a first control terminal, and supply a control voltage supplied through a reference power terminal to the first node in response to a second select signal supplied to a second control terminal and the stored carry signal of the previous stage.

Each of the first input circuit, the second input circuit, the first output circuit, the second output circuit, and the sampling circuit may include an oxide semiconductor transistor.

The control voltage may be a gate-on voltage at which the oxide semiconductor transistor is turned on.

The sampling circuit may include: a first transistor coupled between the first input terminal and a first control node, the first transistor including a gate electrode coupled to the first control terminal; a capacitor coupled between the first control node and the reference power terminal; a second transistor coupled between the reference power terminal and a second control node, the second transistor including a gate electrode coupled to the first control node; and a third transistor coupled between the second control node and the first node, the third transistor including a gate electrode coupled to the second control terminal.

The first transistor may include a first sub-transistor and a second sub-transistor, which are coupled in series to each other. One electrode of the first sub-transistor and one electrode of the second sub-transistor may be coupled to the second control node.

The sampling circuit may discharge the first node in response to a scan start signal supplied to a third control terminal.

The sampling circuit may further include a fourth transistor coupled between a first power terminal to which a first power source is applied and the first node, the fourth transistor including a gate electrode coupled to the third control terminal. The first power source may have a voltage level lower than a voltage level of the control voltage.

A stage that receives a carry signal of a previous stage, which has a pulse overlapping with that of the first select signal, from among the stages may be selected. The selected stage may output the sensing signal corresponding to the sensing clock signal, after a pulse of the second select signal is applied.

The stages may be initialized in response to a scan start signal corresponding to the carry signal of the previous stage.

The scan driver may further include a feedback circuit configured to supply the control voltage to the first input circuit and the second input circuit in response to the voltage of the first node.

The first input circuit may include: a fifth transistor including a first electrode coupled to the first input terminal, a second electrode coupled to a feedback node, and a gate electrode coupled to the first input terminal; and a sixth transistor including a first electrode coupled to the feedback node, a second electrode coupled to the first node, and a gate electrode coupled to the first input terminal. The feedback circuit may include a seventh transistor including a first electrode coupled to the reference power terminal, a second electrode coupled to the feedback node, and a gate electrode coupled to the first node.

The second input circuit may control the voltage of the first node in response to a voltage of a second node. The second input circuit may include: a ninth transistor including a first electrode coupled to the first node, a second electrode coupled to the feedback node, and a gate electrode coupled to the second input terminal; a tenth transistor including a first electrode coupled to the feedback node, a second electrode coupled to a first power terminal to which the first power source is applied, and a gate electrode coupled to the second input terminal; an eleventh transistor including a first electrode coupled to the first node, a second electrode coupled to the feedback node, and a gate electrode coupled to the second node; and a twelfth transistor including a first electrode coupled to the feedback node, a second electrode coupled to the first power terminal to which the first power source is applied, and a gate electrode coupled to the second node.

The scan driver may further include a controller configured to supply the sensing clock signal, and configured to discharge the second node in response to the voltage of the first node.

The first input circuit may include: a fifth transistor including a first electrode coupled to the reference power terminal, a second electrode coupled to a feedback node, and a gate electrode coupled to the first input terminal; and a sixth transistor including a first electrode coupled to the feedback node, a second electrode coupled to the first node, and a gate electrode coupled to the first input terminal. The feedback circuit may include a seventh transistor including a first electrode coupled to the reference power terminal, a second electrode coupled to the feedback node, and a gate electrode coupled to the first node.

The scan driver may further include a feedback circuit configured to supply the nth scan signal or the nth sensing signal to the first input circuit and the second input circuit.

In accordance with an embodiment of the present disclosure, there is provided a display device including: a plurality of pixels respectively coupled to scan lines, sensing lines, readout lines, and data lines; a scan driver including a plurality of stages configured to supply a scan signal to the scan lines and a sensing signal to the sensing lines; a data driver configured to supply a data signal to the data lines; and a compensator configured to generate a compensation value for compensating for degradation of the pixels, based on sensing values provided from the readout lines, wherein an nth (n is a natural number) stage from among the stages includes: a first input circuit configured to control a voltage of a first node in response to a carry signal of a previous stage of the nth stage, which is supplied to a first input terminal; a second input circuit configured to control the voltage of the first node in response to a carry signal of a next stage of the nth stage, which is supplied to a second input terminal; a first output circuit configured to output, to a first output terminal, an nth carry signal corresponding to a carry clock signal supplied to a first clock terminal in response to the voltage of the first node; a second output circuit configured to output, to a second output terminal, an nth scan signal corresponding to a scan clock signal supplied to a second clock terminal in response to the voltage of the first node, and output, to a third output terminal, an nth sensing signal corresponding to a sensing clock signal supplied to a third clock terminal in response to the voltage of the first node; and a sampling circuit configured to store the carry signal of the previous stage in response to a first select signal supplied to a first control terminal, and supply a control voltage supplied through a reference power terminal to the first node in response to a second select signal supplied to a second control terminal and the stored carry signal of the previous stage.

The scan driver may further include a dummy stage configured to generate a reference carry signal corresponding to a scan start signal, and provide a first stage from among the stages with the reference carry signal as the carry signal of the previous stage. The dummy stage may be electrically separated from the scan lines and the sensing lines.

In a first period, the data signal may be provided to the data lines, and the first select signal may be provided to the stages. In a second period, the data signal may not be provided to the data lines, and the second select signal may be provided to the stages.

A stage that receives the carry signal of a previous stage, which has a pulse overlapping with a pulse of the first select signal, from among the stages may be selected. The selected stage may output the sensing signal corresponding to the sensing clock signal, when a pulse of the second select signal is applied.

The sampling circuit may discharge the first node in response to a scan start signal supplied to a third control terminal.

BRIEF DESCRIPTION OF THE DRAWINGS

Example embodiments will now be described more fully hereinafter with reference to the accompanying drawings, in which like reference numbers refer to like elements throughout. The present invention, however, may be embodied in different forms and should not be construed as limited to the embodiments set forth herein. Rather, these embodiments are provided so that this disclosure will be thorough and complete, and will fully convey the scope of the example embodiments to those skilled in the art. Accordingly, processes, elements, and techniques that are not necessary to those having ordinary skill in the art for a complete understanding of the aspects and features of the present invention may not be described.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
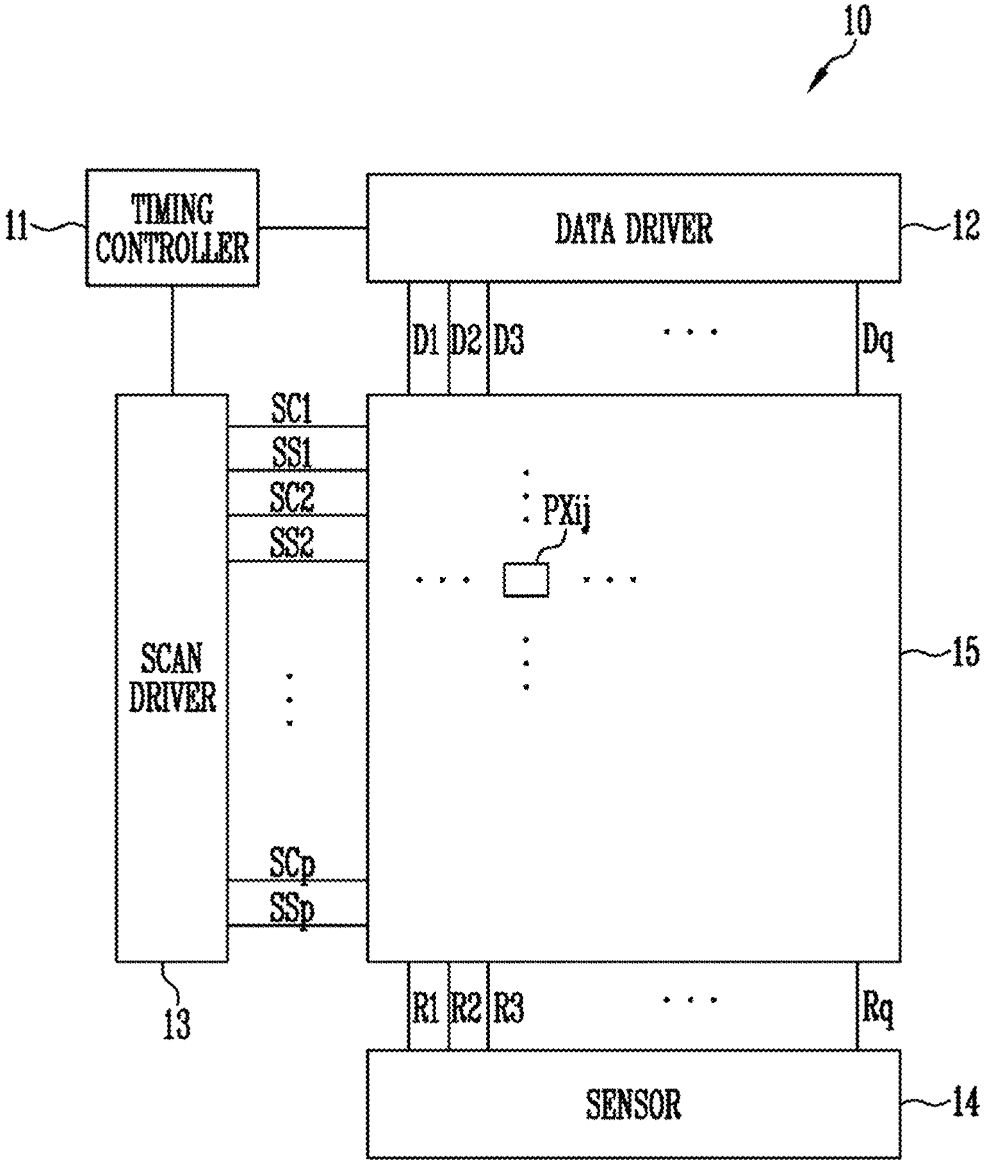
FIG. 1 is a block diagram illustrating a display device in accordance with an embodiment of the present disclosure.

Example embodiments of the present disclosure may illustrate different variations and shapes in detail with particular examples. However, the examples are not limited to certain shapes and variations. For example, in some embodiments, equivalent material may be used as a substitute.

Meanwhile, in the following embodiments and the attached drawings, elements not directly related to the present disclosure may be omitted from depiction, and dimensional relationships from among individual elements in the attached drawings may be exaggerated for ease of understanding and may not be drawn to actual scale. It should be noted that in giving reference numerals to elements of each drawing, like reference numerals refer to like elements throughout even though like elements are shown in different drawings.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept."

As used herein, the term "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device in accordance with an embodiment of the present disclosure.

Referring to FIG. 1, the display device 10 in accordance with the embodiment of the present disclosure may include a timing controller 11, a data driver 12, a scan driver (or gate driver) 13, a sensor (or sensing driver) 14, and a pixel unit (or display panel) 15.

The timing controller 11 may provide grayscale values (or gray level values), a control signal, and the like to the data driver 12. Also, the timing controller 11 may provide a clock signal, a control signal, and the like to each of the scan driver 13 and the sensor 14.

The data driver 12 may generate data signals to be provided to data lines D1 to Dq (q is a positive integer) by using the grayscale values, the control signal, and the like, which are received from the timing controller 11. For example, the data driver 12 may sample grayscale values by using a clock signal, and provide the data lines D1 to Dq with data signals corresponding to the grayscale values in units of pixel rows.

The scan driver 13 may generate scan signals to be provided to scan lines SC1 to SCp (p is a positive integer) by receiving the clock signal, the control signal, and the like from the timing controller 11. For example, the scan driver 13 may sequentially provide the scan lines SC1 to SCp with scan signals having a pulse of a gate-on voltage (e.g, a pulse reaching a gate-on voltage level or a turn-on voltage level). For example, the scan driver 13 may generate scan signals in a manner that sequentially transfers the pulse of the gate-on voltage to a next stage according to the clock signal. For example, the scan driver 13 may be configured in the form of a shift register.

Also, the scan driver 13 may generate sensing signals to be provided to sensing lines SS1 to SSp. For example, the scan driver 13 may sequentially provide the sensing lines SS1 to SSp with sensing signals having a pulse of a gate-on voltage. For example, the scan driver 13 may generate sensing signals in a manner that sequentially transfers the pulse of the gate-on voltage to a next stage according to the clock signal.

However, the above-described operation of the scan driver 13 is associated with an operation in a display period (e.g., active period or data recording period in which data signals are provided to the data lines D1 to Dq), and an operation in a sensing period (e.g., blank period, vertical blank period or porch period) will be described later with reference to FIG. 6. The display period and the sensing period may be included in one frame period (or one frame).

The sensor 14 may measure degradation information of pixels according to a current or voltage received through reception lines R1 to Rq. For example, the degradation information of the pixels may be mobility information of driving transistors, threshold voltage information of the driving transistors, degradation information of light emitting elements, etc. Also, the sensor 14 may measure characteristic information of the pixels under an environment according to the current or voltage received through the reception lines R1 to Rq. For example, the sensor 14 may measure characteristic information of the pixel, which is changed depending on temperature or humidity.

The pixel unit 15 may include a pixel PXij (or pixels). The pixel PXij (i and j are positive integers) may be coupled to a corresponding data line (e.g., Dj), a corresponding scan line (e.g., SCi), a corresponding sensing line (e.g., SSi), and a corresponding reception line (e.g., Rj). In other words, the pixel PXij may be coupled to an ith scan line SCi and be coupled to a jth data line Dj.

Figure 2:
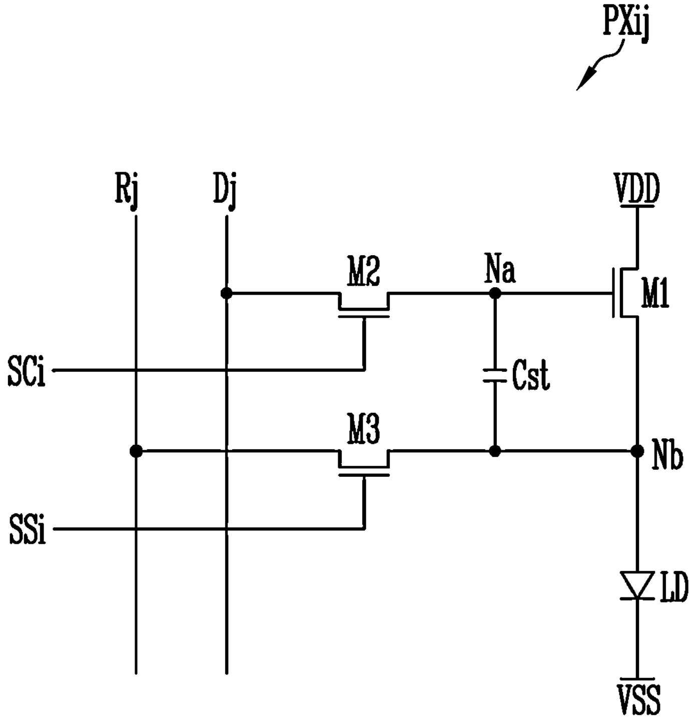
FIG. 2 is a circuit diagram illustrating an example of a pixel included in the display device shown in FIG. 1.

FIG. 2 is a circuit diagram illustrating an example of the pixel included in the display device shown in FIG. 1.

Referring to FIG. 2, the pixel PXij may include switching elements M1, M2, and M3, a storage capacitor Cst, and a light emitting element LD. Each of the switching elements M1, M2, and M3 may be implemented with an n-type transistor.

A first switching element (or driving transistor) M1 may include a first electrode coupled to a first power source VDD (or a first power line to which the first power source VDD is applied), a second electrode coupled to a second node Nb, and a gate electrode coupled to a first node Na.

A second switching element (or switching transistor) M2 may include a first electrode coupled to a data line Dj, a second electrode coupled to the first node Na, and a gate electrode coupled to a scan line SCi.

A third switching element (or sensing transistor) M3 may include a first electrode coupled to a reception line Rj, a second electrode coupled to the second node Nb, and a gate electrode coupled to a sensing line SSi.

The storage capacitor Cst may be coupled between the first node Na and the second node Nb.

An anode of the light emitting element LD may be coupled to the second node Nb, and a cathode of the light emitting element LD may be coupled to a second power source VSS (or a second power line to which the second power source VSS is applied). The light emitting element LD may be configured with an organic light emitting diode, an inorganic light emitting diode, or the like.

In a display period during one frame period, a pulse of a gate-on voltage (e.g., gate-on voltage level or turn-on voltage level) may be applied to the scan line SCi and the sensing line SSi. A corresponding data signal may be applied to the data line Dj, and a first reference voltage may be applied to the reception line Rj. The second and third switching elements M2 and M3 may be turned on, and the storage capacitor Cst may store a voltage corresponding to the difference between the data signal and the first reference voltage. Subsequently, when the second and third switching elements M2 and M3 are turned off, an amount of driving current flowing through the first switching element M1 may be determined corresponding to the voltage stored in the storage capacitor Cst, and the light emitting element LD may emit light, corresponding to the amount of driving current.

Figure 3:
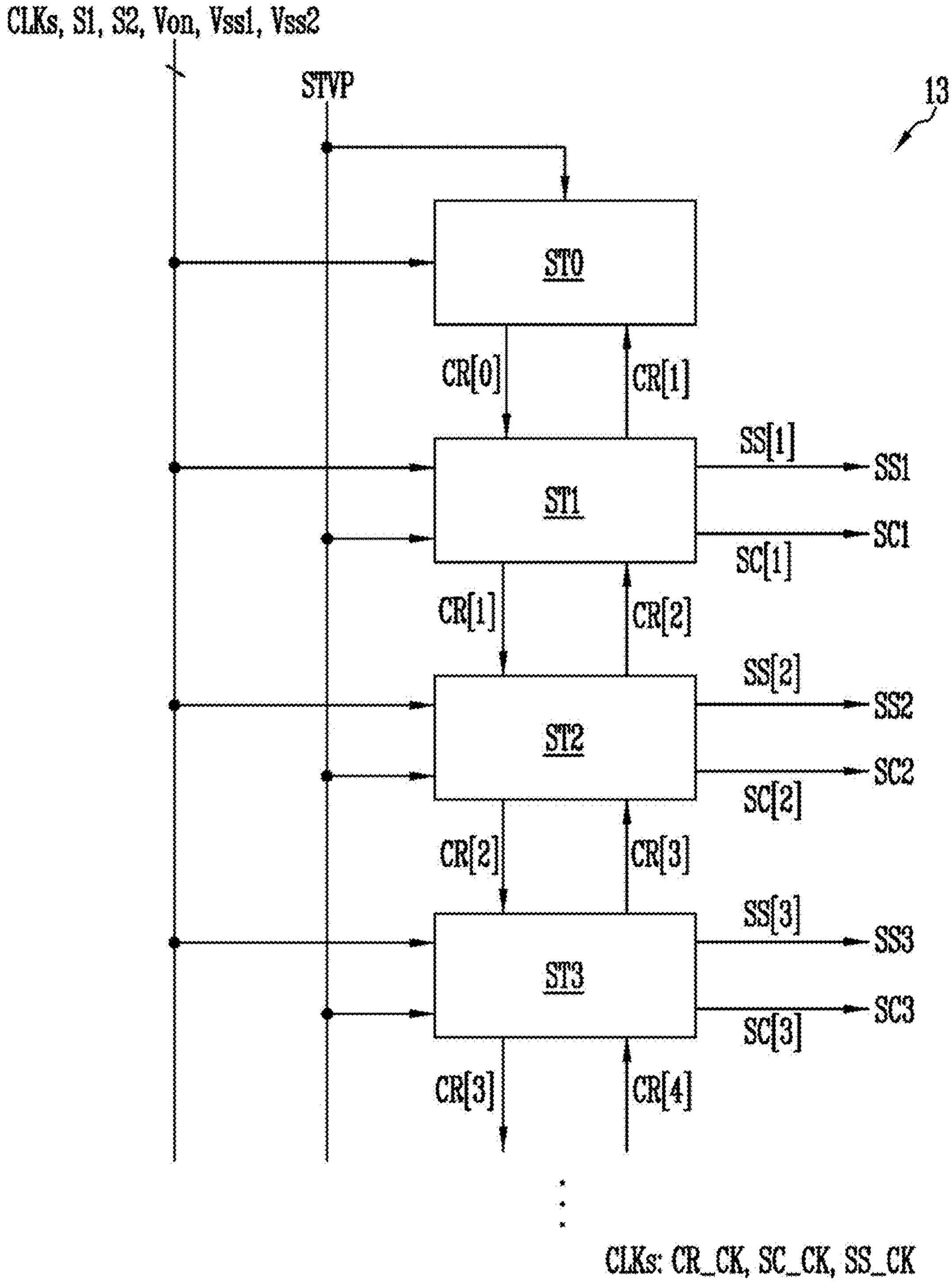
FIG. 3 is a diagram illustrating an example of a scan driver included in the display device shown in FIG. 1.

FIG. 3 is a diagram illustrating an example of the scan driver included in the display device shown in FIG. 1.

Referring to FIG. 3, the scan driver 13 may include a plurality of stages ST1, ST2, and ST3. Also, the scan driver 13 may further include a dummy stage ST0.

Clock signals CLKs, a first signal (or first select signal) S1, a second signal (or second select signal) S2, a control voltage Von (e.g., gate-on voltage Von or high voltage), a first power source Vss1 (e.g., gate-off voltage or first low voltage), and a second power source (or second low voltage) Vss2 may be applied to the dummy stage ST0 and the stages ST1, ST2, and ST3. The clock signals CLKs, the first signal S1, and the second signal S2 may be included in a control signal, and be provided from the timing controller 11. The control voltage Von, the first power source Vss1, and the second power source Vss2 may be provided from the timing controller 11, the data driver 12, or a separate power supply.

The clock signals CLKs may include a first clock signal (or carry clock signal) CR_CK, a second clock signal (or scan clock signal) SC_CK, and a third clock signal (or sensing clock signal) SS_CK.

Each of the first clock signal CR_CK, the second clock signal SC_CK, and the third clock signal SS_CK may be set as a square wave signal in which a logic high level and a logic low level are alternately repeated. The logic high level may correspond to a gate-on voltage, and the logic low level may correspond to a gate-off voltage. For example, the logic high level may be a voltage value of about 10 V to about 30 V, and the logic low level may be a voltage value of about −16 V to about −3 V.

In an embodiment, the clock signals CLKs may be provided to odd-numbered stages ST1 and ST3, and inverted clock signals may be provided to even-numbered stages ST2 (and the dummy stage ST0). The inverted clock signals may have a period equal to that of the clock signals CLKs. The inverted clock signals CLKs may have a phase inverted with respect to that of the clock signals CLKs or have a phase delayed by a half period with respect to that of the clock signals CLKs. In an embodiment, the inverted clock signals may be provided to the odd-numbered stages ST1 and ST3, and the clock signals CLKs may be provided to the even-numbered stages ST2 (and the dummy stage ST0).

Each of the first signal S1 and the second signal S2 may include a pulse having a logic high level. The first signal S1 and the second signal S2 may be used to select one of the stages ST1, ST2, and ST3. A configuration for selecting one of the stages ST1, ST2, and ST3 by using the first signal S1 and the second signal S2 will be described later with reference to FIG. 6.

The control voltage Von may correspond to a gate-on voltage, and each of the first power source Vss1 and the second power source Vss2 may correspond to a gate-off voltage. For example, the control voltage Von may have a voltage value of about 10 V to about 30 V. In an embodiment, the first power source Vss1 and the second power source Vss2 may be the same (e.g., the first power source Vss1 and the second power source Vss2 may have the same voltage level). In another embodiment, the second power source Vss2 may have a voltage level lower (or less) than that of the first power source Vss1. For example, the first power source Vss1 may be set in a range of about −14 V to about −1 V, and the second power source Vss2 may be set in a range of about −16 V to about −3V.

The dummy stage ST0 may generate a reference carry signal CR[0] in response to a scan start signal (or start pulse) STVP, and provide the reference carry signal CR[0] to a first stage ST1. The scan start signal STVP may be included in the control signal, and be provided from the timing controller 11. The dummy stage ST0 is not coupled to scan lines and sensing lines, and may be electrically separated (e.g., electrically isolated) from the scan lines and the sensing lines.

The stages ST1, ST2, and ST3 may output scan signals SC[1], SC[2], and SC[3] and carry signals CR[1], CR[2], and CR[3] in response to carry signals provided from previous stages, respectively. For example, the first stage ST1 may output a first scan signal SC[1] to a first scan line SC1 and output a first carry signal CR[1] to a second stage ST2, in response to the reference carry signal CR[0]. The first carry signal CR[1] may also be provided to the dummy stage ST0. Similarly, the second stage ST2 may output a second scan signal SC[2] to a second scan line SC2 and provide a second carry signal CR[2] to a third stage ST3 and the first stage ST1, in response to the first carry signal CR[1]. That is, an nth (n is a positive integer) stage may output an nth scan signal to an nth scan line and provide an nth carry signal to an (n+1)th stage and an (n−1)th stage, in response to an (n−1)th carry signal.

Figure 4:
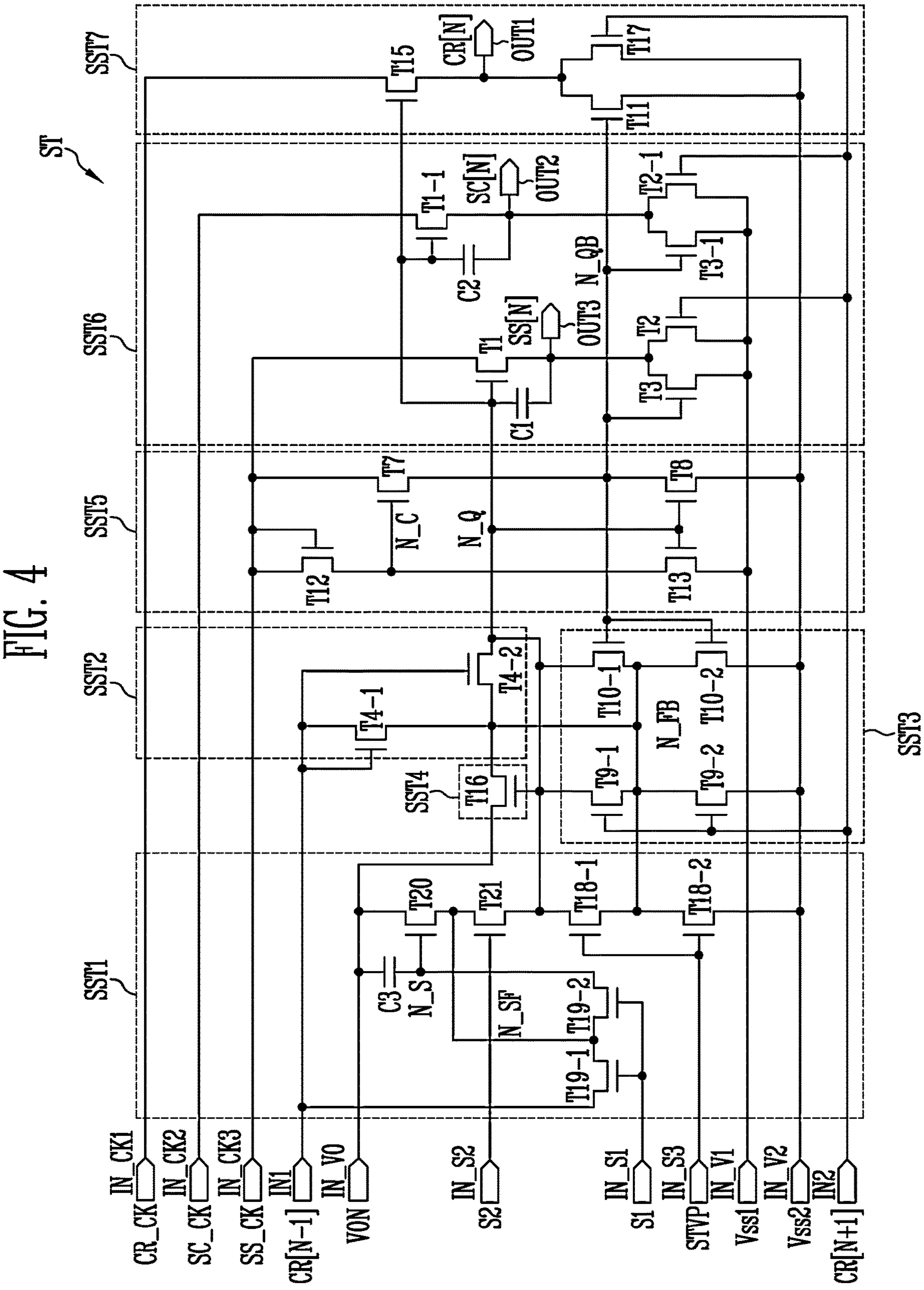
FIG. 4 is a circuit diagram illustrating an example of a stage included in the scan driver shown in FIG. 1.

FIG. 4 is a circuit diagram illustrating an example of the stage included in the scan driver shown in FIG. 1. The first to third stages ST1 to ST3 (and the dummy stage ST0) shown in FIG. 3 are substantially similar to one another, a stage ST will be described, including the first to third stages ST1 to ST3.

Referring to FIG. 4, the stage ST may include a first clock terminal IN_CK1, a second clock terminal IN_CK2, a third clock terminal IN_CK3, a first input terminal IN1, a second input terminal IN2, a first control terminal IN_S1, a second control terminal IN_S2, a third control terminal IN_S3, a reference power terminal IN_V0, a first power terminal IN_V1, a second power terminal IN_V2, a first output terminal OUT1, a second output terminal OUT2, and a third output terminal OUT3.

A first clock signal (or carry clock signal) CR_CK may be provided to the first clock terminal IN_CK1, a second clock signal (or scan clock signal) SC_CK may be provided to the second clock terminal IN_CK2, and a third clock signal (or sensing clock signal) SS_CK may be provided to the third clock terminal IN_CK3.

A carry signal of a previous stage (i.e., a previous stage carry signal CR[N−1] may be provided to the first input terminal IN1), a carry signal of a next stage (i.e., a next stage carry signal CR[N+1] may be provided to the second input terminal IN2), and a scan start signal (or start pulse) STVP may be provided to the third control terminal IN_S3.

A first signal (or first select signal) S1 may be provided to a first control terminal IN_S1, and a second signal (or second select signal) S2 may be provided to the second control terminal IN_S2.

A control voltage (or gate-on voltage) Von may be provided to the reference power terminal IN_V0, a first power source Vss1 is applied to the first power terminal IN_V1, and a second power source Vss2 may be applied to the second power terminal IN_V2.

A carry signal CR[N] may be output through the first output terminal OUT1, a scan signal SC[N] may be output through the second output terminal OUT2, and a sensing signal SS[N] may be output through the third output terminal OUT3.

The stage ST may include first to fifth sub-stages SST1 to SST5. The first to fifth sub-stages SST1 to SST5 may include first to fourth transistors T1, T2, T3, and T4-1 and T4-2, first to third auxiliary transistors T1-1, T2-1, and T3-1, seventh to thirteenth transistors T7, T8, T9-1, T9-2, T10-1, T10-2, T11, T12, and T13, fifteenth to twenty-first transistors T15, T16, T17, T18-1, T18-2, T19-1, T19-2, T20, and T21, and first to third capacitors C1, C2, and C3. Each of the transistors may be an oxide semiconductor transistor or n-type transistor.

The first sub-stage (or sampling unit, sampling circuit) SST1 may store a carry signal of a previous stage (i.e., a previous stage carry signal CR[N−1]) in response to the first signal (or first control signal) S1 supplied to the first control terminal IN_S1, and supply the control voltage Von supplied through the reference power terminal IN_V0 to a first node N_Q in response to the second signal (or second select signal) S2 supplied to the second control terminal IN_S2 and the stored previous stage carry signal CR[N−1]. Also, the first sub-stage SST1 may discharge the first node N_Q in response to the scan start signal STVP supplied to the third control terminal IN_S3.

The first sub-stage SST1 may include the eighteenth transistor T18-1 and T18-2, the nineteenth transistor T19-1 and T19-2, the twentieth transistor T20, the twenty-first transistor T21, and the third capacitor C3. The eighteenth transistor T18-1 and T18-2 may be implemented with a dual gate transistor including an (18-1)th transistor T18-1 and an (18-2)th transistor T18-2, and the nineteenth transistor T19-1 and T19-2 may be implemented with a dual gate transistor including a (19-1)th transistor T19-1 and a (19-2)th transistor T19-2.

The (18-1)th transistor T18-1 and the (18-2)th transistor T18-2 may be electrically coupled between the first node N_Q and the second power terminal IN_V2. The (18-1)th transistor T18-1 may include a first electrode coupled to the first node N_Q, a second electrode coupled to a third node (or feedback node) N_FB, and a gate electrode coupled to the third control terminal IN_S3. The (18-2)th transistor T18-2 may include a first electrode coupled to the third node N_FB, a second electrode coupled to the second power terminal IN_V2 to which a second power source Vss2 is applied, and a gate electrode coupled to the third control terminal IN_S3.

The (18-1)th transistor T18-1 and the (18-2)th transistor T18-2 may discharge or pull down the first node N_Q by using the second power source Vss2 in response to the scan start signal STVP.

The (19-1)th transistor T19-1 and the (19-2)th transistor T19-2 may be coupled between the first input terminal IN1 and a first control node N_S. The (19-1)th transistor T19-1 may include a first electrode coupled to the first input terminal IN1, a second electrode coupled to a second control node N_SF, and a gate electrode coupled to the first control terminal IN_S1. The (19-2)th transistor T19-2 may include a first electrode coupled to the second control node N_SF, a second electrode coupled to the first control node N_S, and a gate electrode coupled to the first control terminal IN_S1.

The (19-1)th transistor T19-1 and the (19-2)th transistor T19-2 may transfer a previous stage carry signal CR[N−1] to the first control node N_S in response to the first signal S1.

The third capacitor C3 may be coupled between the reference power terminal IN_V0 and the first control node N_S. The third capacitor C3 may be charged by the previous stage carry signal CR[N−1] transmitted through the (19-1)th transistor T19-1 and the (19-2)th transistor T19-2 or store the previous stage carry signal CR[N−1].

The twentieth transistor T20 may include a first electrode coupled to the reference power terminal IN_V0, a second electrode coupled to a second control node N_SF, and a gate electrode coupled to the first control node N_S. The twentieth transistor T20 may transfer the control voltage Von to the second control node N_SF in response to a voltage (e.g., the previous stage carry signal CR[N−1]) of the first control node N_S.

The twenty-first transistor T21 may include a first electrode coupled to the second control node N_SF, a second electrode coupled to the first node N_Q, and a gate electrode coupled to the second control terminal IN_S2. The twenty-first transistor T21 may transfer a voltage (e.g., the control voltage Von) of the second control node N_SF in response to the second signal S2.

In an embodiment, the first sub-stage SST1 may turn on the twentieth transistor T20 while charging the third capacitor C3 by using the previous stage carry signal CR[N−1] in a period in which the previous stage carry signal CR[N−1] of a gate-on voltage and the first signal S1 of a gate-on voltage overlap with each other during a display period (or data writing period). Also, when the second signal S2 of a gate-on voltage is applied in a blank period (or sensing period), the first sub-stage SST1 may transfer the control voltage Von to the first node N_Q through the twentieth transistor T20 and the twenty-first transistor T21. In other words, the first node N_Q may be charged.

The second sub-stage (or charger or first input unit or first input circuit) SST2 may control a voltage of the first node N_Q in response to a carry signal of a previous stage (i.e., a previous stage carry signal CR[N−1] supplied to the first input terminal IN1).

The second sub-stage SST2 may include the fourth transistor T4-1 and T4-2. The fourth transistor T4-1 and T4-2 may be implemented with a dual gate transistor including a (4-1)th transistor T4-1 and a (4-2)th transistor T4-2.

The (4-1)th transistor T4-1 and the (4-2)th transistor T4-2 may be coupled between the first input terminal IN1 and the first node N_Q. The (4-1)th transistor T4-1 may include a first electrode coupled to the first input terminal IN1, a second electrode coupled to the third node N_FB, and a gate electrode coupled to the first input terminal IN1. The (4-2)th transistor T4-2 may include a first electrode coupled to the third node N_FB, a second electrode coupled to the first node N_Q, and a gate electrode coupled to the first input terminal IN1.

The second sub-stage SST2 (or fourth transistor T4-1 and T4-2) may charge the first node N_Q by receiving the previous stage carry signal CR[N−1].

The third sub-stage SST3 (or stabilizer or second input unit or second input circuit) may control the voltage of the first node N_Q in response to a carry signal of a next stage (i.e., a next stage carry signal CR[N+1] supplied to the second input terminal IN2).

The third sub-stage SST3 may include the ninth transistor T9-1 and T9-2 and the tenth transistor T10-1 and T10-2. The ninth transistor T9-1 and T9-2 may be implemented with a dual gate transistor including a (9-1)th transistor T9-1 and a (9-2)th transistor T9-2, and the tenth transistor T10-1 and T10-2 may be implemented with a dual gate transistor including a (10-1)th transistor T10-1 and a (10-2)th transistor T10-2.

The ninth transistor T9-1 and T9-2 and the tenth transistor T10-1 and T10-2 may be coupled between the first node N_Q and the second power terminal IN_V2.

The (9-1)th transistor T9-1 may include a first electrode coupled to the first node N_Q, a second electrode coupled to the third node N_FB, and a gate electrode coupled to the second input terminal IN2. The (9-2)th transistor T9-2 may include a first electrode coupled to the third node N_FB, a second electrode coupled to the second power terminal IN_V2, and a gate electrode coupled to the second input terminal IN2.

Similarly, the (10-1)th transistor T10-1 may include a first electrode coupled to the first node N_Q, a second electrode coupled to the third node N_FB, and a gate electrode coupled to a second node N_QB. The (10-2)th transistor T10-2 may include a first electrode coupled to the third node N_FB, a second electrode coupled to the second power terminal IN_V2, and a gate electrode coupled to the second node NQB.

The (9-1)th transistor T9-1 and the (9-2)th transistor T9-2 may discharge or pull down the first node N_Q using the second power source Vss2 in response to the next stage carry signal CR[N+1]. Similarly, the (10-1)th transistor T10-1 and the (10-2)th transistor T10-2 may discharge the first node N_Q in response to a voltage of the second node N_QB.

That is, the third sub-stage SST3 may discharge the first node N_Q in response to the next stage carry signal CR[N+1] and the voltage of the second node N_QB.

The fourth sub-stage (or feedback unit or feedback circuit) SST4 may supply the control voltage Von to the second sub-stage SST2 and the third sub-stage SST3 in response to the voltage of the first node N_Q.

The fourth sub-stage SST4 may include the sixteenth transistor T16.

The sixteenth transistor T16 may include a first electrode coupled to the reference power terminal IN_V0, a second electrode coupled to the third node N_FB, and a gate electrode coupled to the first node N_Q.

The fourth sub-stage SST4 (or sixteenth transistor T16) may charge the third node N_FB with the control voltage Von, when the first node N_Q is charged.

The fifth sub-stage (or inverter or controller) SST5 supplies the third clock signal (or sensing clock signal) SS_CK to the second node N_QB, and may discharge the second node N_QB in response to the voltage of the first node N_Q.

The fifth sub-stage SST5 may include the seventh transistor T7, the eighth transistor T8, the twelfth transistor T12, and the thirteenth transistor T13.

The seventh transistor T7 may include a first electrode coupled to the third clock terminal IN_CK3, a second electrode coupled to the second node N_QB, and a gate electrode coupled to a fourth node N_C.

The eighth transistor T8 may include a first electrode coupled to the second node N_QB, a second electrode coupled to the second power terminal IN_V2, and a gate electrode coupled to the first node N_Q.

The twelfth transistor T12 may include a first electrode coupled to the third clock terminal IN_CK3, a second electrode coupled to the fourth node N_C, and a gate electrode coupled to the third clock terminal IN_CK3.

The thirteenth transistor T13 may include a first electrode coupled to the fourth node N_C, a second electrode coupled to the first power terminal IN_V1, and a gate electrode coupled to the first node N_Q.

The fifth sub-stage SST5 provides a signal synchronized with the third clock signal SS_CK to the second node N_QB, and may discharge the second node N_QB, when the voltage of the first node N_Q is sufficiently higher than a voltage level of the first power source Vss1.

The sixth sub-stage (or first output unit or first output circuit) SST6 may output, to the first output terminal OUT1, a carry signal CR[N] corresponding to the first clock signal (or carry clock signal) CR_CK supplied to the first clock terminal IN_CK1, in response to the voltage of the first node N_Q.

The sixth sub-stage SST6 may include the first transistor T1, the second transistor T2, the third transistor T3, and the first capacitor C1. Also, the sixth sub-stage SST6 may further include the first auxiliary transistor T1-1, the second auxiliary transistor T2-1, the third auxiliary transistor T3-1, and the second capacitor C2.

The first transistor T1 may include a first electrode coupled to the third clock terminal IN_CK3, a second electrode coupled to the third output terminal OUT3, and a gate electrode coupled to the first node N_Q.

The second transistor T2 may include a first electrode coupled to the third output terminal OUT3, a second electrode coupled to the first power terminal IN_V1, and a gate electrode coupled to the second input terminal IN2.

The third transistor T3 may include a first electrode coupled to the third output terminal OUT3, a second electrode coupled to the first power terminal IN_V1, and a gate electrode coupled to the second node N_QB.

The first capacitor C1 may be coupled between the first node N_Q and the third output terminal OUT3.

The first capacitor C1 may store the control voltage Von transferred through the second sub-stage SST2 and the fourth sub-stage SST4. When the first node N_Q is charged, the first transistor T1 may transfer the third clock signal SS_CK to the third output terminal OUT3. The third clock signal SS_CK may be output as the sensing signal SS[N].

The second transistor T2 may discharge or pull down the output of the third output terminal OUT3 in response to the next stage carry signal CR[N+1], and the third transistor T3 may discharge or pull down the output of the third output terminal OUT3 in response to the voltage of the second node N_QB.

That is, the sixth sub-stage SST6 may output the third clock signal SS_CK as the sensing signal SS[N] in response to the voltage of the first node N_Q, and pull down the sensing signal SS[N] in response to the next stage carry signal CR[N+1] and the voltage of the second node N_QB.

The first auxiliary transistor T1-1 may include a first electrode coupled to the second clock terminal IN_CK2, a second electrode coupled to the second output terminal OUT2, and a gate electrode coupled to the first node N_Q.

The second auxiliary transistor T2-1 may include a first electrode coupled to the second output terminal OUT2, a second electrode coupled to the first power terminal IN_V1, and a gate electrode coupled to the second input terminal IN2.

The third auxiliary transistor T3-1 may include a first electrode coupled to the second output terminal OUT2, a second electrode coupled to the first power terminal IN_V1, and a gate electrode coupled to the second node N_QB.

The second capacitor C2 may be coupled between the first node N_Q and the second output terminal OUT2.

The second capacitor C2 may store the control voltage Von transferred through the second sub-stage SST2 and the fourth sub-stage SST4. When the first node N_Q is charged, the first auxiliary transistor T1-1 may transfer the second clock signal SC_CK to the second output terminal OUT2. The second clock signal SC_CK may be output as the scan signal SC[N].

The second auxiliary transistor T2-1 may discharge or pull down the output of the second output terminal OUT2 in response to the next stage carry signal CR[N+1], and the third auxiliary transistor T3-1 may discharge or pull down the output of the second output terminal OUT2 in response to the voltage of the second node NQB.

That is, the sixth sub-stage SST6 may output the second clock signal SC_CK as the scan signal SC[N] in response to the voltage of the first node N_Q, and pull down the scan signal SC[N] in response to the next stage carry signal CR[N+1] and the voltage of the second node N_QB.

The seventh sub-stage (or second output unit or second output circuit) SST7 may output, to the second output terminal OUT2, a scan signal SC[N] corresponding to the second clock signal (or scan clock signal) SC_CK supplied to the second clock terminal IN_CK2, in response to the voltage of the first node N_Q, and output, to the third output terminal OUT3, a sensing signal SS[N] corresponding to the third clock signal SS_CK (or sensing clock signal) supplied to the third clock terminal IN_CK3, in response to the voltage of the first node N_Q.

The seventh sub-stage SST7 may include the eleventh transistor T11, the fifteenth transistor T15, and the seventeenth transistor T17.

The eleventh transistor T11 may include a first electrode coupled to the first output terminal OUT1, a second electrode coupled to the second power terminal IN_V2, and a gate electrode coupled to the second node N_QB.

The fifteenth transistor T15 may include a first electrode coupled to the first clock terminal IN_CK1, a second electrode coupled to the first output terminal OUT1, and a gate electrode coupled to the first node N_Q.

The seventeenth transistor T17 may include a first electrode coupled to the first output terminal OUT1, a second electrode coupled to the second power terminal IN_V2, and a gate electrode coupled to the second input terminal IN2.

When the first node N_Q is charged, the fifteenth transistor T15 may transfer the first clock signal CR_CK to the third output terminal OUT3, and the first clock signal CR_CK may be output as the carry signal CR[N].

The eleventh transistor T11 may discharge or pull down the output of the second output terminal OUT2 in response to the voltage of the second node N_QB, and the seventeenth transistor T17 may discharge and pull down the output of the second output terminal OUT2 in response to the next stage carry signal CR[N+1].

That is, the seventh sub-stage SST7 may output the first clock signal CR_CK as the carry signal CR[N] in response to the voltage of the first node N_Q, and pull down the carry signal CR[N] in response to the next stage carry signal CR[N+1] and the voltage of the second node N_QB.

Figure 5:
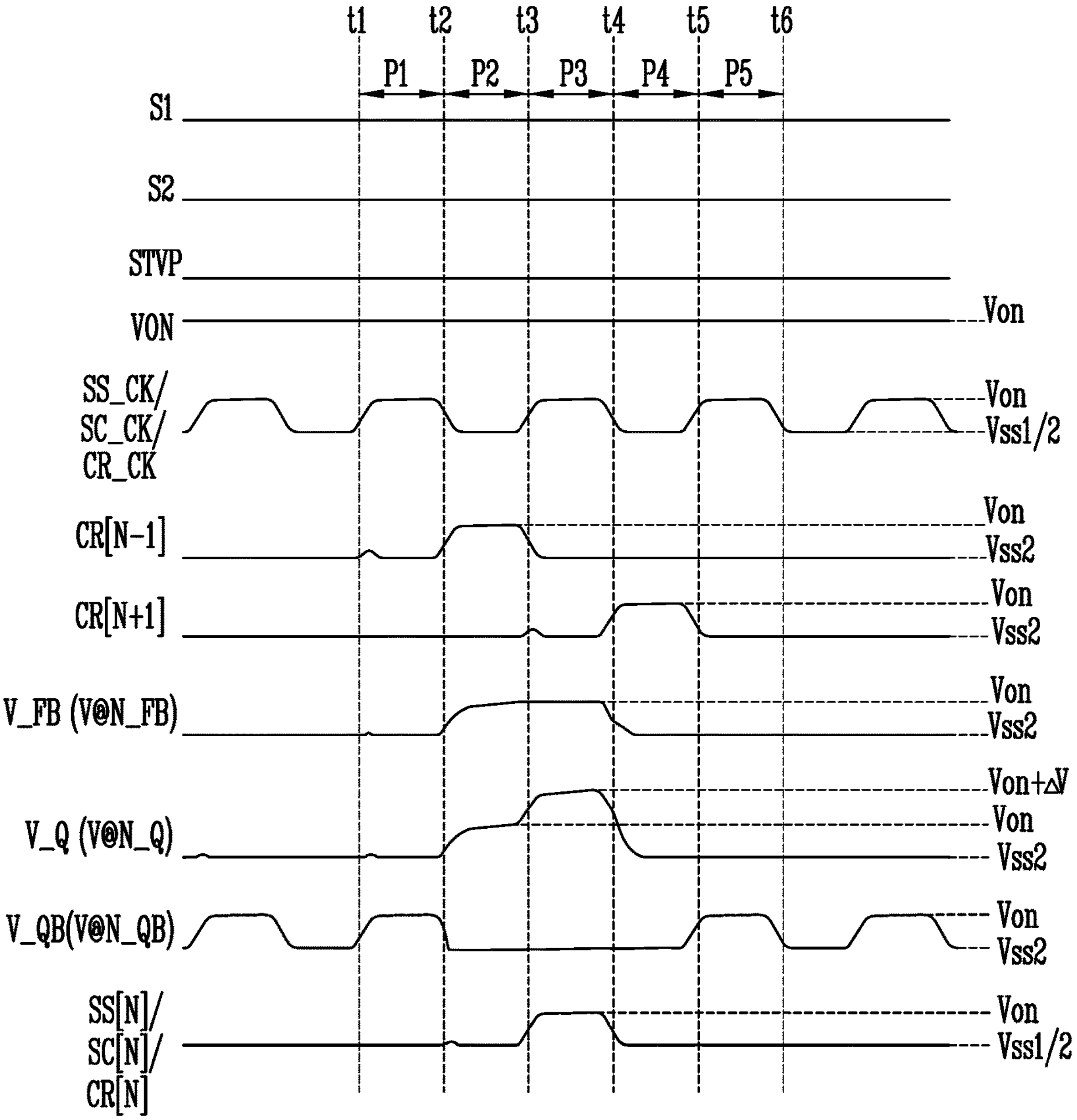
FIG. 5 is a waveform diagram illustrating an example of signals measured in the stage shown in FIG. 4.

FIG. 5 is a waveform diagram illustrating an example of signals measured in the stage shown in FIG. 4. One frame period may include a display period (or active period) in which a data signal is provided to data lines or in which an image is displayed and a sensing period (e.g., vertical blank period or period in which any valid data signal is not provided to the data lines) between the display period and an adjacent display period. In FIG. 5, signals measured in the stage operating in the display period are illustrated.

Referring to FIGS. 4-5, each of the first signal S1, the second signal S2, and the scan start signal STVP may have a gate-off voltage (or logic low level). For example, the gate-off voltage may be equal to the voltage level of the first power source Vss1 or the voltage level of the second power source Vss2, which is described with reference to FIG. 4.

The control voltage Von may be equal to a gate-on voltage Von.

Each of the first clock signal CR_CK, the second clock signal SC_CK, and the third clock signal SS_CK may repeatedly have a logic high level and a logic low level. In other words, the first clock signal CR_CK, the second clock signal SC_CK, and the third clock signal SS_CK may each alternate between a logic high level and a logic low level.

At a first time t1, the third clock signal SS_CK may be changed from the gate-off voltage to the gate-on voltage Von. In a first period P1 between the first time t1 and a second time t2, the third clock signal SS_CK may maintain the gate-on voltage Von.

The fifth sub-stage SST5 may transfer the third clock signal SS_CK of the gate-on voltage Von to the second node N_QB. A voltage of the fourth node N_C may rise when the twelfth transistor T12 is turned on. The seventh transistor T7 may be turned on in response to the voltage of the fourth node N_C. A voltage of the second node N_QB (i.e., a second node voltage V_QB) may rise up to the gate-on voltage Von.

At the second time t2, the third clock signal SS_CK may be changed to the gate-off voltage.

The previous stage carry signal CR[N−1] may be changed from the gate-off voltage to the gate-on voltage Von, and maintain the gate-on voltage Von during a second period P2 between the second time t2 and a third time t3.

The second sub-stage SST2 may charge the first node N_Q and the third node N_FB by receiving the previous stage carry signal CR[N−1]. The fourth transistor T4-1 and T4-2 may be turned on in response to the previous stage carry signal CR[N−1] of the gate-on voltage Von, and the previous stage carry signal CR[N−1] of the gate-on voltage Von may be transferred to the first node N_Q and the third node N_FB. A voltage of the first node N_Q (i.e., a first node voltage V_Q) may rise, and a voltage of the third node N_FB (i.e., a third node voltage V_FB) may rise. Each of the first node voltage V_Q and the third node voltage V_FB may rise up to the gate-on voltage Von.

Meanwhile, the eighth transistor T8 of the fifth sub-stage SST5 may be turned on in response to the first node voltage V_Q. The second node N_QB may be discharged or pulled down to the second power source Vss2. The second node voltage V_QB may be changed to the gate-off voltage.

In addition, each of the first transistor T1, the first auxiliary transistor T1-1, and the fifteenth transistor T15 of the sixth sub-stage SST6 may be turned on. However, during the second period P2, each of the third clock signal SS_CK, the second clock signal SC_CK, and the first clock signal CR_CK has the gate-off voltage. Therefore, each of the scan signal SC[N], the sensing signal SS[N], and the carry signal CR[N] may have the gate-off voltage.

At the third time t3, each of the first clock signal CR_CK, the second clock signal SC_CK, and the third clock signal SS_CK may be changed to the gate-on voltage Von. In addition, during a third period P3 between the third time t3 and a fourth time t4, each of the first clock signal CR_CK, the second clock signal SC_CK, and the third clock signal SS_CK may maintain the gate-on voltage Von.

Each of the first transistor T1 and the first auxiliary transistor T1-1 of the sixth sub-stage SST6 and the fifteenth transistor T15 of the seventh sub-stage SST7 maintains a turn-on state. Therefore, each of the scan signal SC[N], the sensing signal SS[N], and the carry signal CR[N] may have the gate-on voltage Von according to the third clock signal SS_CK, the second clock signal SC_CK, and the first clock signal CR_CK.

Meanwhile, the first node voltage V_Q may rise up to a voltage level (e.g., Von+ΔV) greater than the gate-on voltage Von due to capacitive coupling (or capacitive boosting) of the first capacitor C1 and the second capacitor C2 of the sixth sub-stage SST6.

A gate-source voltage (e.g., Vgs) of each of the (4-2)th transistor T4-2, the (9-1)th transistor T9-1, the (10-1)th transistor T10-1, and the (18-1)th transistor T18-1 may be equal to the difference (i.e., Vss2−Von) between the voltage level of the second power source Vss2 and the gate-on voltage Von. Therefore, a current leaked through the (4-2)th transistor T4-2, the (9-1)th transistor T9-1, the (10-1)th transistor T10-1, and the (18-1)th transistor T18-1 from the first node N_Q is very small, and accordingly, the leakage current may not be considered.

At the fourth time t4, the next stage carry signal CR[N+1] may be changed from the gate-off voltage to the gate-on voltage Von. During a fourth period P4 between the fourth time t4 and a fifth time t5, the next stage carry signal CR[N+1] may maintain the gate-on voltage Von.

The sixth sub-stage SST6 and the seventh sub-stage SST7 may pull down each of the scan signal SC[N], the sensing signal SS[N], and the carry signal CR[N] in response to the next stage carry signal CR[N+1] of the gate-on voltage Von. Each of the second transistor T2 and the second auxiliary transistor T2-1 of the sixth sub-stage SST6 and the seventeenth transistor T17 of the seventh sub-stage SST7 may be turned on in response to the next stage carry signal CR[N+1] of the gate-on voltage Von, and the scan signal SC[N], the sensing signal SS[N], and the carry signal CR[N] may be changed to the first power source Vss1 (i.e., the gate-off voltage).

In addition, the third sub-stage SST3 may discharge the first node N_Q in response to the next stage carry signal CR[N+1] of the gate-on voltage Von. The ninth transistor T9-1 and T9-2 of the third sub-stage SST3 may be turned on in response to the next stage carry signal CR[N+1] of the gate-on voltage Von, and the first node voltage V_Q may be changed to the second power source Vss2 (i.e., the gate-off voltage).

At the fifth time t5, the third clock signal SS_CK may be changed from the gate-off voltage to the gate-on voltage Von.

An operation of the stage ST in a fifth period P5 between the fifth time t5 and a sixth time t6 may be substantially similar to that of the stage ST in the first period P1. Therefore, redundant descriptions will not be repeated.

Figure 6:
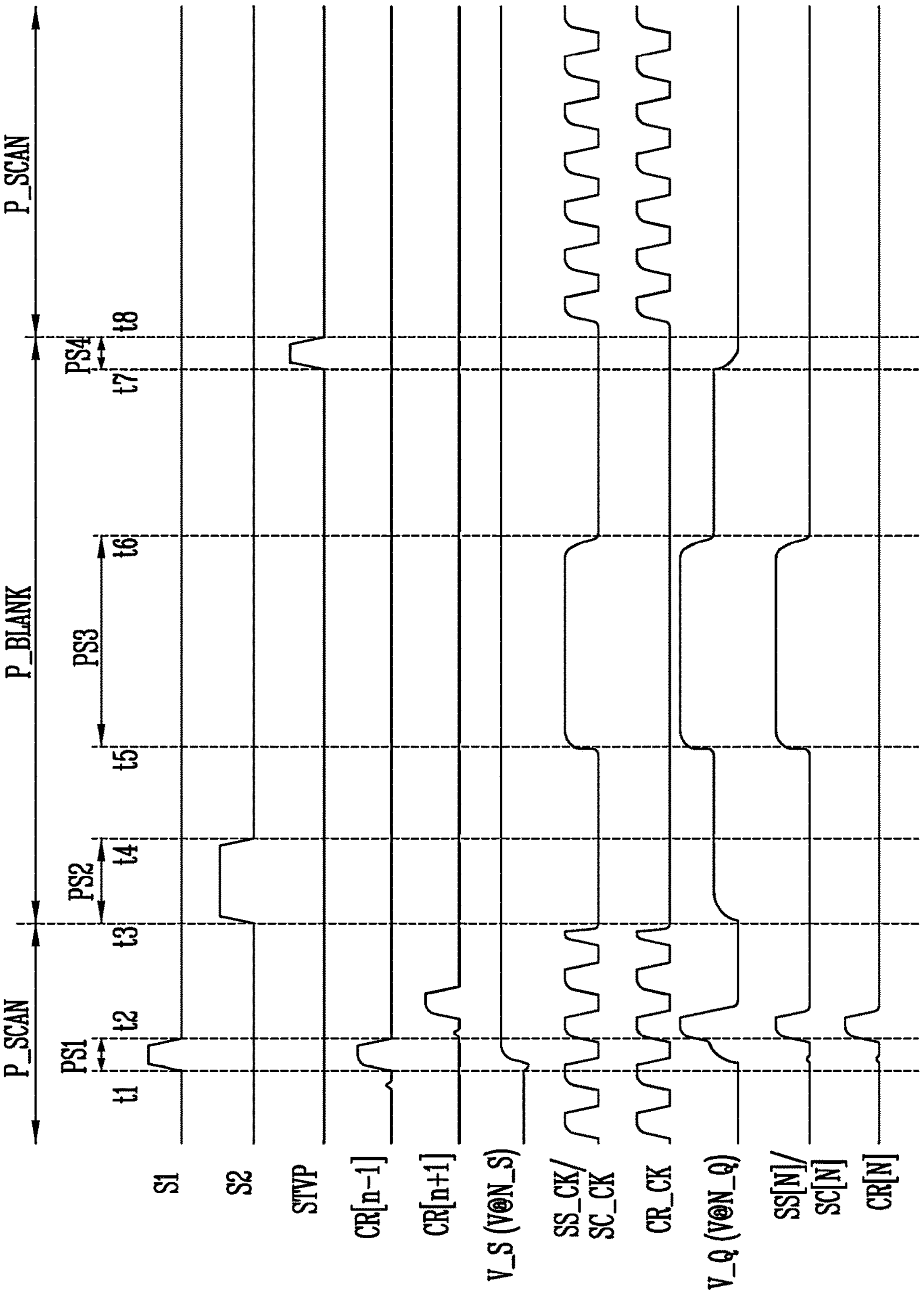
FIG. 6 is a waveform diagram illustrating an example of the signals measured in the stage shown in FIG. 4.

FIG. 6 is a waveform diagram illustrating an example of the signals measured in the stage shown in FIG. 4.

Referring to FIGS. 4-6, an operation of the stage ST in a display period P_SCAN is substantially similar to that of the stage ST, which is described with reference to FIG. 5, and therefore, redundant descriptions will not be repeated.

As shown in FIG. 6, during a first sub-period PS1 between a first time t1 and a second time t2, the first signal (or first control signal) may have a gate-on voltage.

A stage that receives a previous stage carry signal CR[N−1] (i.e., a carry signal of a previous stage) having a pulse overlapping with a pulse (i.e., a pulse of the gate-on voltage) of the first signal S1 may be selected from among the stages ST1, ST2, and ST3 (see FIG. 3). That is, a stage that receives the previous stage carry signal CR[N−1] overlapping with the first signal S1 may be selected.

In the selected stage, the (19-1)th transistor T19-1 and the (19-2)th transistor T19-2 may be turned on in response to the first signal S1 of the gate-on voltage. The first control node N_S may be charged by the previous stage carry signal CR[N−1] of the gate-on voltage. A voltage of the first control node N_S (i.e., a first control node voltage V_S) may rise up to the gate-on voltage. The first control node voltage V_S may be maintained as the gate-on voltage by the third capacitor C3.

A blank period (or sensing period) P_BLANK may include a second sub-period PS2, a third sub-period PS3, and a fourth sub-period PS4.

During the second sub-period PS2 between a third time t3 and a fourth time t4, the second signal (or second control signal) S2 may have the gate-on voltage.

In the selected stage, the twenty-first transistor T21 may be turned on in response to the second signal S2 of the gate-on voltage. Meanwhile, the turn-on state of the twentieth transistor T20 may be maintained by the first control node voltage V_S. Therefore, the control voltage Von may be provided to the first node N_Q. The first node N_Q may be charged with the control voltage Von. A voltage of the first node N_Q (i.e., a first node voltage V_Q) may rise up to the gate-on voltage.

In the selected stage, each of the first transistor T1, the first auxiliary transistor T1-1, and the fifteenth transistor T15 may be turned on in response to the first node voltage V_Q.

However, each of the first clock signal CR_CK, the second clock signal SC_CK, and the third clock signal SS_CK may maintain a gate-off voltage, and accordingly, a carry signal CR[N], a scan signal SC[N], and a sensing signal SS[N], each of which has the gate-off voltage, may be output.

Subsequently, during a third sub-period PS3 between a fifth time t5 and a sixth time t6, the second clock signal SC_CK may have the gate-on voltage. Because the first auxiliary transistor T1-1 maintains the turn-on state, a scan signal SC[N] corresponding to the second clock signal SC_CK of the gate-on voltage may be output through the second output terminal OUT2.

Similarly, the third clock signal SS_CK may have the gate-on voltage. Because the first transistor T1 maintains the turn-on state, a sensing signal SS[N] corresponding to the third clock signal SS_CK of the gate-on voltage may be output through the third output terminal OUT3.

That is, after the second signal S2 (i.e., a pulse of the gate-on voltage) is applied, the selected stage may output a scan signal SC[N] corresponding to the second clock signal SC_CK, and output a sensing signal SS[N] corresponding to the third clock signal SS_CK.

The first node voltage V_Q may rise up to a voltage level (e.g., Von+ΔV (see FIG. 4)) greater than the gate-on voltage due to capacitive coupling of the first capacitor C1 and the second capacitor C2.

A gate-source voltage (e.g., Vgs) of each of the (4-2)th transistor T4-2, the (9-1)th transistor T9-1, the (10-1)th transistor T10-1, and the (18-1)th transistor T18-1 may be equal to the difference (i.e., Vss2−Von) between the voltage level of the second power source Vss2 and the gate-on voltage Von. Therefore, a current leaked through the (4-2)th transistor T4-2, the (9-1)th transistor T9-1, the (10-1)th transistor T10-1, and the (18-1)th transistor T18-1 from the first node N_Q is very small, and accordingly, the leakage current may be neglected (or not considered).

Meanwhile, the first clock signal CR_CK maintains the gate-off voltage. Accordingly, a carry signal CR[N] having the gate-off voltage may be output, or any valid (or active) carry signal CR[N] may not be output.

Subsequently, in a fourth sub-period PS4 between a seventh time t7 and an eighth time t8, the scan start signal STVP may have the gate-on voltage.

In the selected stage, the (18-1)th transistor T18-1 and the (18-2)th transistor T18-2 may be turned on in response to the scan start signal STVP of the gate-on voltage, and the first node N_Q may be discharged to the second power source Vss2. Accordingly, the first node voltage V_Q may fall down or discharge to the gate-off voltage.

As described with reference to FIGS. 3-6, the scan driver 13 (and the display device 10) in accordance with an embodiment of the present disclosure includes a plurality of stages ST1, ST2, and ST3, each of which outputs a carry signal, a scan signal, and a sensing signal, and each of the stages ST1, ST2, and ST3 may include a first sub-stage (or sampling unit or sampling circuit) SST1 that stores a previous stage carry signal CR[N−1] in response to the first signal S1. Thus, only a stage that receives the previous stage carry signal CR[N−1] (e.g., the previous stage carry signal CR[N−1] of the gate-on voltage) overlapping with the first signal S1 is selected, and a scan signal SC[N] and a sensing signal SS[N] are output through the selected stage in the blank period P_BLANK.

Figure 7:
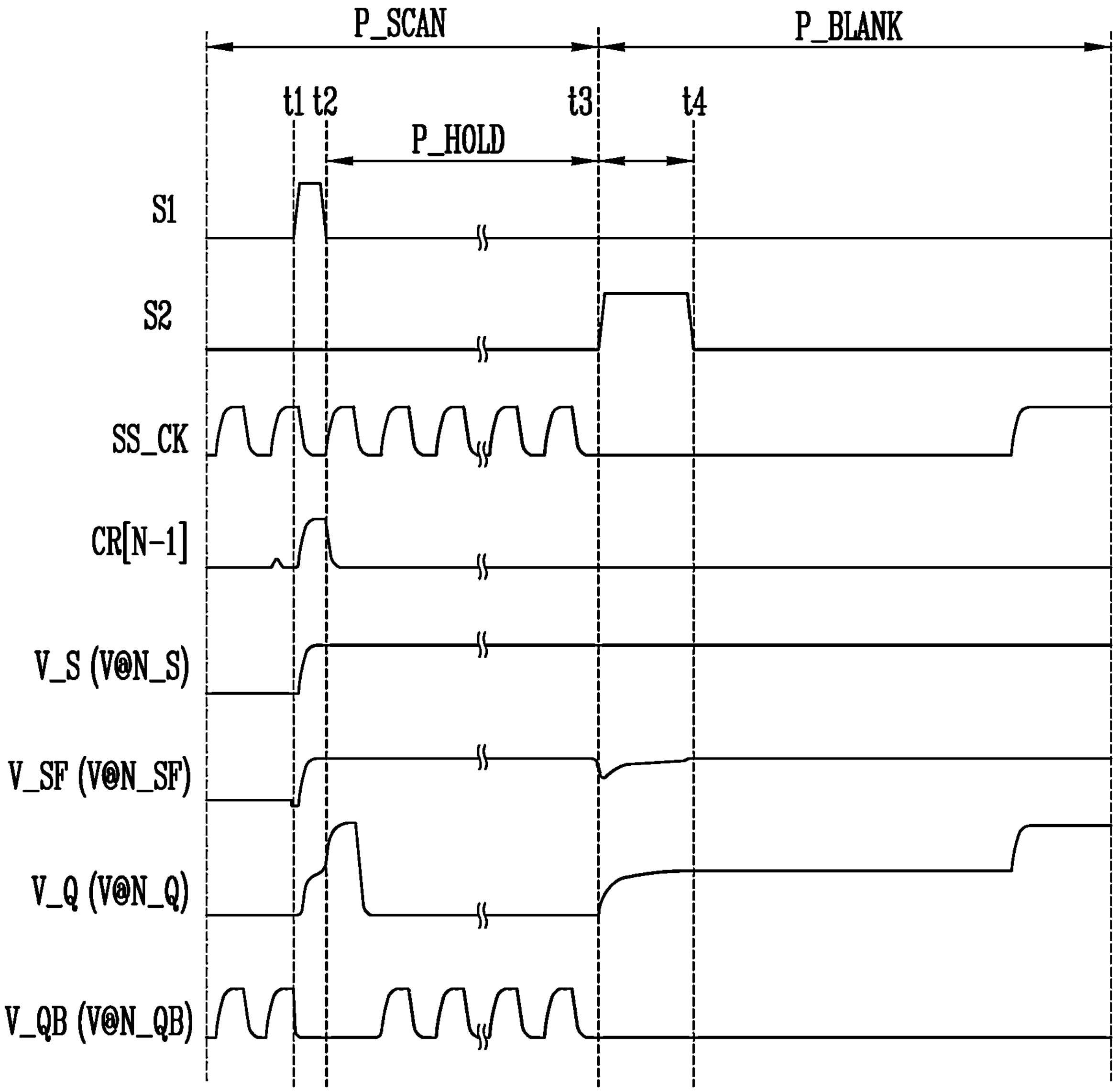
FIG. 7 is a waveform diagram illustrating still an example of the signals measured in the stage shown in FIG. 4.

FIG. 7 is a waveform diagram illustrating an example of the signals measured in the stage shown in FIG. 4. In FIG. 7, the voltage of the first control node N_S (i.e., the first control node voltage V_S), the voltage of the second control node N_SF (i.e., the second control node voltage V_SF), the voltage of the first node N_Q (i.e., the first node voltage V_Q), and the voltage of the second node N_QB (i.e., the second node voltage V_QB) in the stage shown in FIG. 4 are illustrated.

Referring to FIGS. 4, 6, and 7, an operation of the stage ST in a period between a first time t1 and a second time t2 may be substantially similar to that of the stage ST in the first sub-period PS1 described with reference to FIG. 6. In addition, an operation of the stage ST in a period between a third time t3 and a fourth time t4 may be substantially identical to that of the stage ST in the second sub-period PS2 described with reference to FIG. 6. Therefore, redundant descriptions will not be repeated.

During the period between the first time t1 and the second time t2, the first signal (or first control signal) S1 may have a gate-on voltage.

From among the stages ST1, ST2, and ST3 (see FIG. 3), a stage that receives a previous stage carry signal CR[N−1] overlapping with the first signal S1 may be selected.

In the selected stage, the (19-1)th transistor T19-1 and the (19-2)th transistor T19-2 may be turned on in response to the first signal S1 of the gate-on voltage. The first control node N_S may be charged by the previous stage carry signal CR[N−1] of the gate-on voltage. A voltage of the first control node N_S (i.e., a first control node voltage V_S) may rise up to the gate-on voltage. The first control node voltage V_S may be maintained as the gate-on voltage by the third capacitor C3.

Meanwhile, in order for the selected stage to normally operate in response to the second signal (or second control signal) S2 of the gate-on voltage in a blank period P_BLANK (or sensing period), the first control node voltage V_S is to be maintained as the gate-on voltage, and leakage current should be prevented or reduced, during a hold period P_HOLD between the second time t2 and the third time t3. For example, the hold period P_HOLD may be about 16 ms, when the scan driver 13 (or display device 10) (see FIG. 1) is driven at 60 Hz.

As described with reference to FIG. 4, in the stage ST in accordance with the embodiment of the present disclosure, the first electrode of the (19-2)th transistor T19-2 may be coupled to the second control node N_SF, and the second electrode of the twentieth transistor T20 may be coupled to the second control node N_SF.

In the hold period P_HOLD, the twentieth transistor T20 maintains the turn-on state in response to the first control node voltage V_S of the gate-on voltage, and therefore, the second control node voltage V_SF may be equal to the control voltage Von (or gate-on voltage). A gate-source voltage of the (19-2)th transistor T19-2 may be equal to the difference between the first signal S1 and the second control node voltage V_SF. For example, the first signal S1 of a gate-off voltage may be within a range of about −16 V to about −3 V. When the second control node voltage V_SF is within a range of about 10 V to about 30 V, the gate-source voltage of the (19-2)th transistor T19-2 may be about −30 V or less (i.e., Vss2−Von).

Thus, during the hold period P_HOLD, a current (or leakage current) flowing through the (19-2)th transistor T19-2 is further decreased, or current leakage of the first control node N_S is prevented or reduced. Accordingly, the first control node voltage V_S can be stably maintained as the gate-on voltage.

Leakage current of the (19-2)th transistor T19-2 will be described with reference to FIG. 8.

Figure 8:
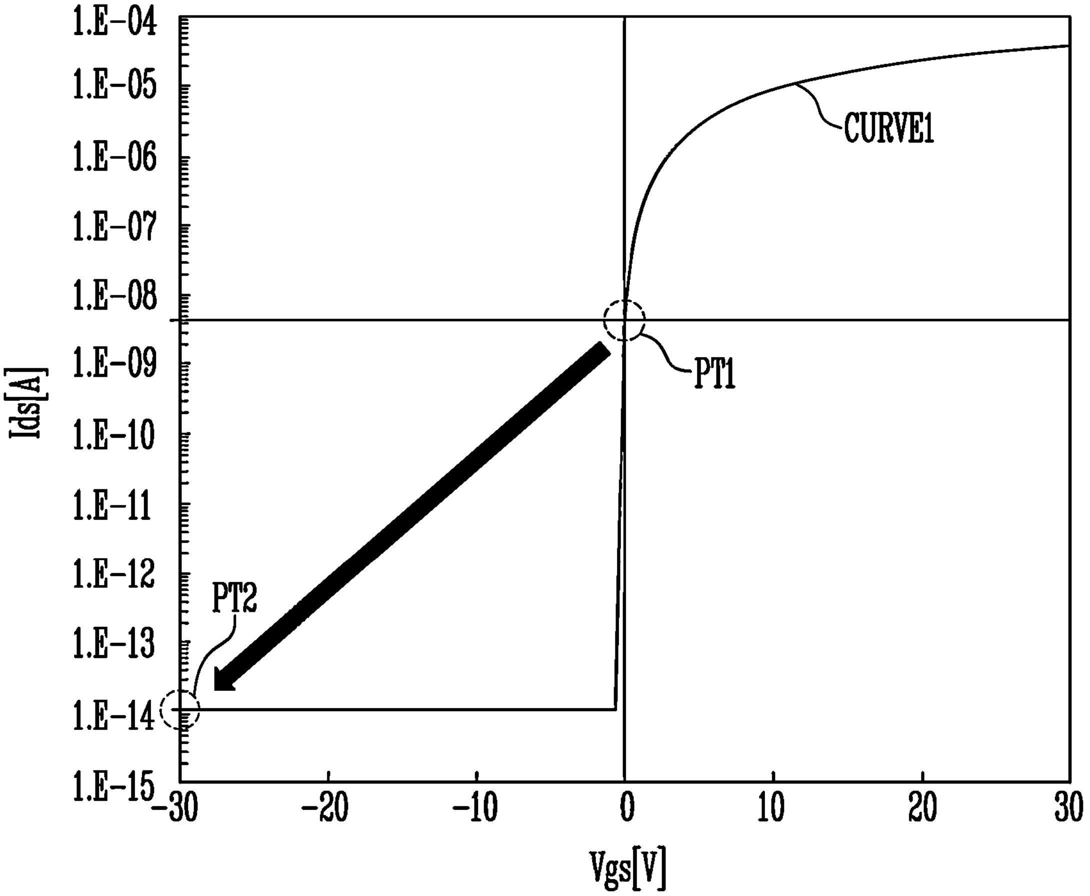
FIG. 8 is a diagram illustrating voltage-current characteristics of a transistor included in the stage shown in FIG. 4.

FIG. 8 is a diagram illustrating voltage-current characteristics of a transistor included in the stage shown in FIG. 4.

Referring to FIG. 8, a first curve CURVE1 represents a current Ids flowing through the transistor included in the stage ST according to a gate-source voltage Vgs of the transistor. The transistor may be an oxide semiconductor transistor.

When the gate-source voltage Vgs is 0 V (i.e., a first point PT1), the current Ids is to be ideally 0, but may be actually about 1.E-08 A (i.e., 1 nA to 10 nA). That is, when the gate-source voltage Vgs is 0 V, a leakage current may exist.

The current Ids may be further decreased as the gate-source voltage Vgs is increased in a negative direction.

When the gate-source voltage Vgs is about −30 V (i.e., at a second point PT2), the current Ids may be about 1.E-14 A (i.e., 10 fA), and be about 1/100000 of that when the gate-source voltage Vgs is 0 V.

Meanwhile, although a case where the current Ids is saturated when the current Ids is about 1.E-14 A (i.e., 10 fA) is illustrated in FIG. 8, this results from the limit of performance of a measuring instrument. The current Ids (or leakage current) may be further decreased as the gate-source voltage Vgs is increased in the negative direction.

Referring back to FIGS. 4 and 7, the second node voltage V_QB may be maintained as the gate-off voltage during the period between the third time t3 and the fourth time t4.

As described with reference to FIG. 4, the fifth sub-stage SST5 may operate in synchronization with the third clock signal (or sensing clock signal) SS_CK, and maintain the second node N_QB to have the gate-off voltage by using the third clock signal SS_CK of the gate-off voltage. That is, the second node N_QB may be controlled using the third clock signal SS_CK. Thus, a separate circuit configuration for controlling the second node voltage V_QB in the blank period P_BLANK is not required, and the area of the first sub-stage SST1 (or sampling circuit) that allows the stage ST to operate in the blank period P_BLANK can be relatively reduced.

As described with reference to FIGS. 7-8, the stage ST (or first sub-stage (or sampling circuit) SST1) stores a previous stage carry signal CR[N−1] in the first control node N_S, and may apply the gate-on voltage by coupling the second electrode of a transistor (e.g., the (19-2)th transistor T19-2) coupled to the first control node N_S to the second control node N_SF. Thus, leakage current of the first control node N_S through the corresponding transistor during the hold period P_HOLD is prevented or reduced, and the scan driver 13 and the display device 10, which include the stage ST, can more stably perform a selective scan/sensing operation.

Figure 9:
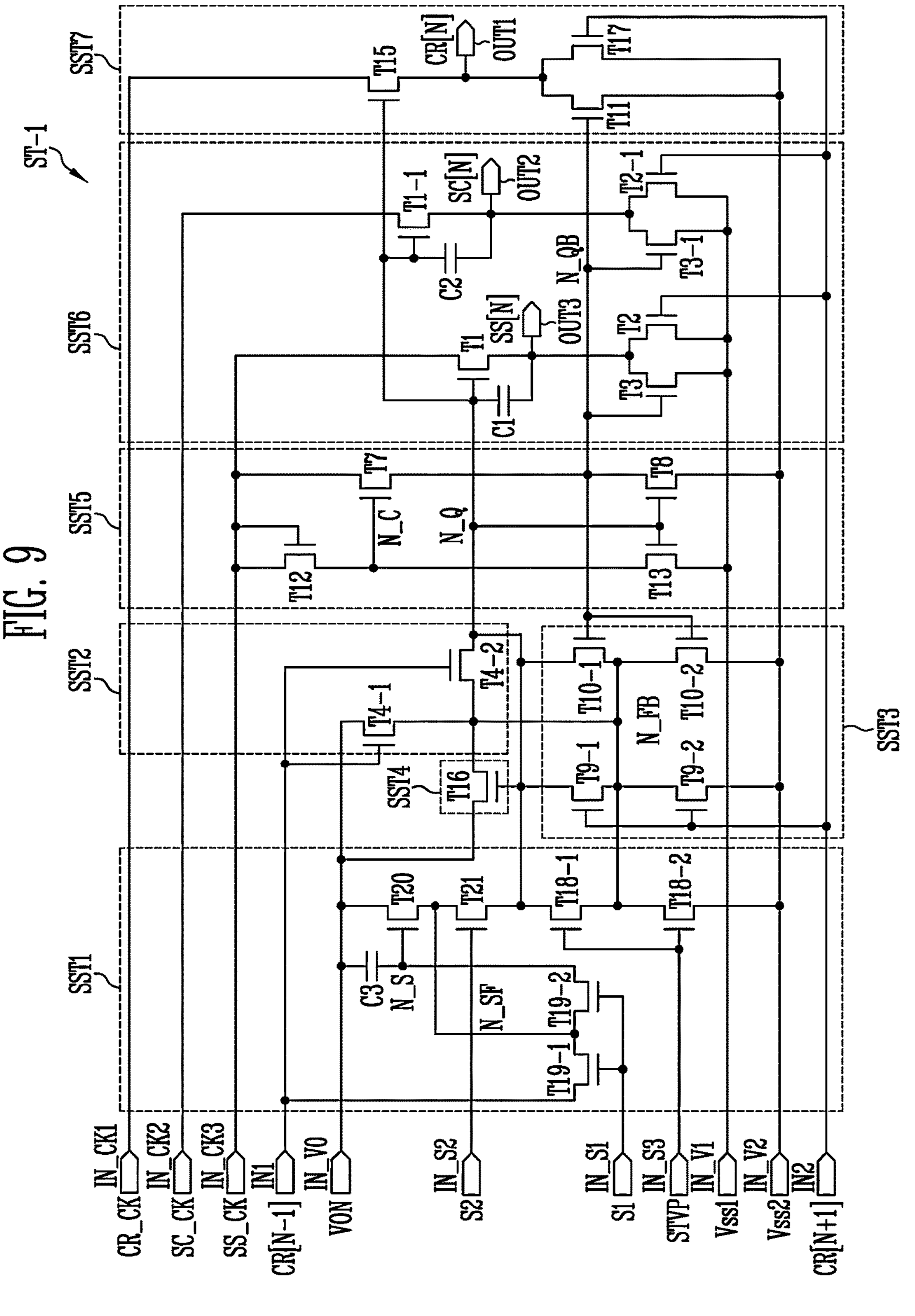
FIG. 9 is a circuit diagram illustrating an example of the stage included in the scan driver shown in FIG. 1.

FIG. 9 is a circuit diagram illustrating an example of the stage included in the scan driver shown in FIG. 1. In FIG. 9, a stage ST-1 corresponding to the stage ST shown in FIG. 4 is illustrated.

Referring to FIGS. 4 and 9, the stage ST-1 shown in FIG. 9 may be substantially similar to the stage ST shown in FIG. 4, except for a coupling configuration of a (4-1)th transistor T4-1 of the second sub-stage SST2. Therefore, redundant descriptions will not be repeated.

The (4-1)th transistor T4-1 may include a first electrode coupled to the reference power terminal IN_V0, a second electrode coupled to the third node N_FB, and a gate electrode coupled to the first input terminal IN1.

Accordingly, the second sub-stage SST2 (or fourth transistor T4-1 and T4-2) can charge the first node N_Q by receiving the control voltage Von in response to a previous stage carry signal CR[N−1].

Figure 10:
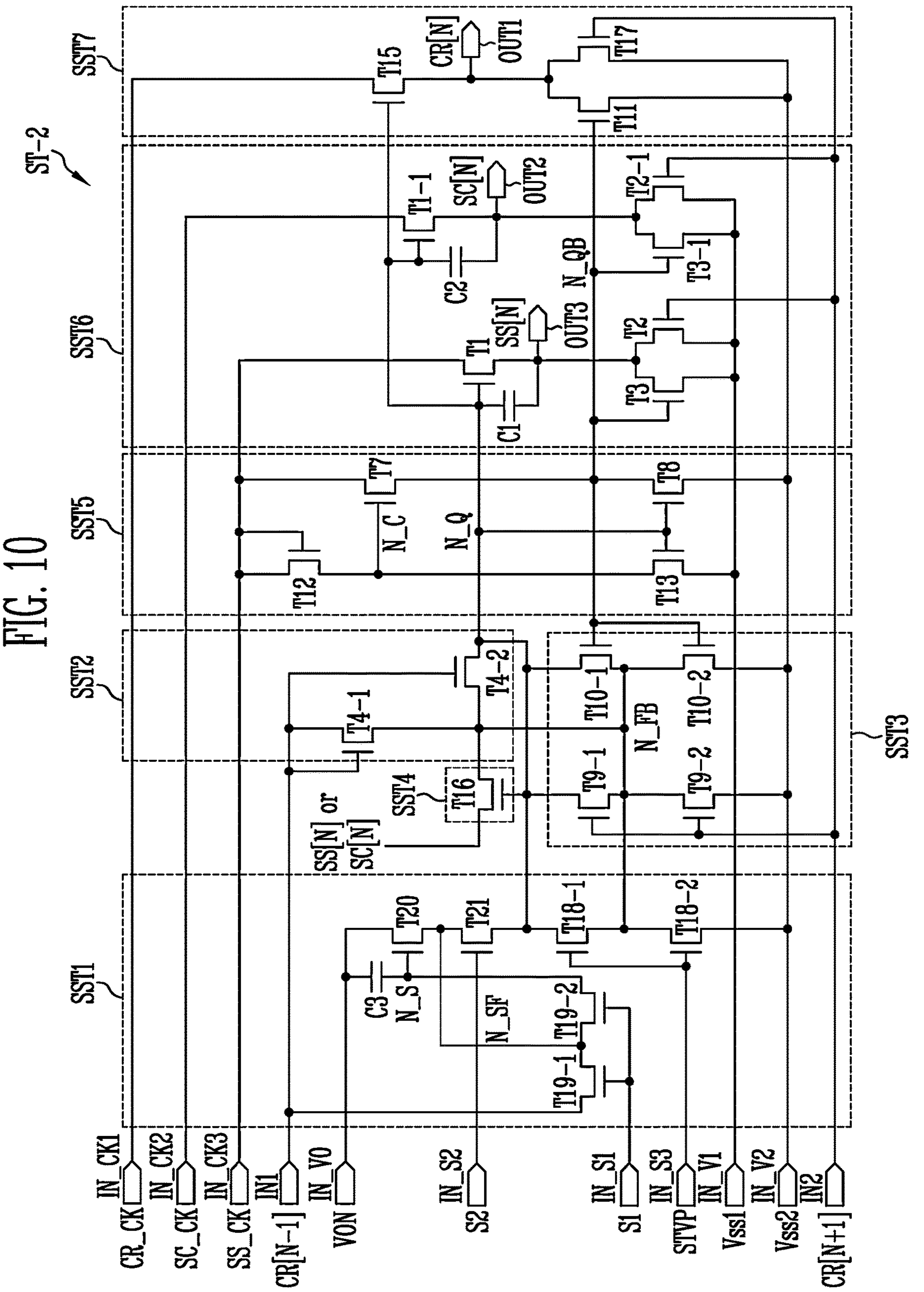
FIG. 10 is a circuit diagram illustrating an example of the stage included in the scan driver shown in FIG. 1.

FIG. 10 is a circuit diagram illustrating an example of the stage included in the scan driver shown in FIG. 1. In FIG. 10, a stage ST-2 corresponding to the stage ST shown in FIG. 4 is illustrated.

Referring to FIGS. 4 and 10, the stage ST-2 shown in FIG. 10 may be substantially similar to the stage ST shown in FIG. 4, except for a fourth sub-stage SST4. Therefore, redundant descriptions will be omitted.

The fourth sub-stage (or feedback circuit) SST4 may receive a scan signal SC[N] or sensing signal SS[N] and supply the scan signal SC[N] or sensing signal SS[N] to the second sub-stage SST2 and the third sub-stage SST3.

The fourth sub-stage SST4 may include a sixteenth transistor T16.

The sixteenth transistor T16 may include a first electrode receiving the scan signal SC[N] or sensing signal SS[N] (or coupled to the second output terminal OUT2 or the third output terminal OUT3), a second electrode coupled to the third node N_FB, and a gate electrode coupled to the first node N_Q.

The fourth sub-stage SST4 (or sixteenth transistor T16) can charge the third node N_FB with the control voltage Von, when the scan signal SC[N] or sensing signal SS[N] of the gate-on voltage is output.

In accordance with the present disclosure, the scan driver and the display device include a plurality of stages, each of which outputs a carry signal, a scan signal, and a sensing signal, and each of the stages may include a sampling circuit configured to store a previous stage carry signal in response to a first signal. Thus, only a stage that receives the previous stage carry signal (e.g., the previous stage carry signal of a gate-on voltage) overlapping with the first signal is selected, and a scan signal and a sensing signal can be output through the selected stage.

Further, the sampling circuit stores the previous stage carry signal at the first control node, and may apply the gate-on voltage by coupling one electrode of a transistor coupled to the first control node to the second control node. Thus, leakage current of the first control node through the corresponding transistor is prevented or reduced, and the scan driver and the display device can more stably perform a selective scan/sensing operation.

While the present invention has been described in connection with the preferred embodiments, it will be understood by those skilled in the art that various modifications and changes can be made thereto without departing from the spirit and scope of the invention defined by the appended claims.

Thus, the scope of the invention should not be limited by the particular embodiments described herein but should be defined by the appended claims, and equivalents thereof.

What is claimed is:

1. A scan driver comprising:

a plurality of stages, one of the plurality of stages being configured to control a voltage of a first node in response to a first signal of a previous stage of the plurality of stages, wherein the one of the plurality of stages comprises:

a first transistor coupled between a first terminal and a second node, the first transistor comprising a gate electrode coupled to a second terminal;

a capacitor coupled between the second node and a third terminal;

a second transistor coupled between the third terminal and a third node, the second transistor comprising a gate electrode coupled to the second node; and a third transistor coupled between the third node and the first node, the third transistor comprising a gate electrode coupled to a fourth terminal.

2. The scan driver of claim 1, wherein the one of the plurality of stages is configured to output a second signal in response to the voltage of the first node.

3. The scan driver of claim 1, wherein each of the first to third transistors comprises an oxide semiconductor transistor.

4. The scan driver of claim 1, wherein the first transistor comprises a first sub-transistor and a second sub-transistor, which are coupled in series to each other.

5. The scan driver of claim 1, wherein the one of the plurality of stages is configured to store the first signal in the capacitor in response to a third signal supplied to the second terminal, and to transfer a fourth signal supplied to the third terminal to the first node in response to a voltage charged in the capacitor and a fifth signal supplied to the fourth terminal.

6. The scan driver of claim 5, wherein the fourth signal supplied to the third terminal has a gate-on voltage to turn on an oxide semiconductor transistor.

7. The scan driver of claim 1, wherein the one of the plurality of stages is configured to discharge the first node in response to a start signal supplied to a fifth terminal.

8. A display device comprising:

a plurality of pixels respectively coupled to lines; and a scan driver comprising a plurality of stages, wherein one of the plurality of stages comprises:

a first transistor coupled between a first terminal and a second node, the first transistor comprising a gate electrode coupled to a second terminal;

a capacitor coupled between the second node and a third terminal;

a second transistor coupled between the third terminal and a third node, the second transistor comprising a gate electrode coupled to the second node; and a third transistor coupled between the third node and a first node, the third transistor comprising a gate electrode directly coupled to a fourth terminal.

9. The display device of claim 8, wherein the one of the plurality of stages is configured to supply a second signal to the lines.

10. The display device of claim 9, wherein the one of the plurality of stages is configured to output the second signal in response to a voltage of the first node.

11. The display device of claim 8, wherein each of the first to third transistors comprises an oxide semiconductor transistor.

12. The display device of claim 8, wherein the scan driver further comprises a dummy stage configured to provide a first signal to a first stage from among the plurality of stages, and wherein the dummy stage is electrically separated from the lines.

13. The display device of claim 8, wherein the first transistor comprises a first sub-transistor and a second sub-transistor, which are coupled in series to each other.

* * * * *